United States Patent
Park et al.

(10) Patent No.: US 12,283,679 B2
(45) Date of Patent: Apr. 22, 2025

(54) BATTERY MODULE AND BATTERY PACK INCLUDING THE SAME

(71) Applicant: LG ENERGY SOLUTION, LTD., Seoul (KR)

(72) Inventors: Won Kyoung Park, Daejeon (KR); Junyeob Seong, Daejeon (KR); Honggoo Han, Daejeon (KR); Hyun Seop Yun, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 512 days.

(21) Appl. No.: 17/764,855

(22) PCT Filed: Jul. 26, 2021

(86) PCT No.: PCT/KR2021/009647
§ 371 (c)(1),
(2) Date: Mar. 29, 2022

(87) PCT Pub. No.: WO2022/045597
PCT Pub. Date: Mar. 3, 2022

(65) Prior Publication Data
US 2022/0344745 A1   Oct. 27, 2022

(30) Foreign Application Priority Data
Aug. 24, 2020   (KR) .................. 10-2020-0106332

(51) Int. Cl.
*H01M 10/6556* (2014.01)
*H01M 10/613* (2014.01)
*H01M 10/6554* (2014.01)

(52) U.S. Cl.
CPC ..... *H01M 10/6556* (2015.04); *H01M 10/613* (2015.04); *H01M 10/6554* (2015.04)

(58) Field of Classification Search
None
See application file for complete search history.

(56) References Cited

U.S. PATENT DOCUMENTS

2020/0152931 A1   5/2020   Kim et al.

FOREIGN PATENT DOCUMENTS

| CN | 106602175 A | 4/2017 |
|----|-------------|--------|
| CN | 109119721 A | 1/2019 |

(Continued)

OTHER PUBLICATIONS

Machine translation DE102015007799A1 (Year: 2016).*

(Continued)

*Primary Examiner* — Victoria H Lynch
(74) *Attorney, Agent, or Firm* — Birch, Stewart, Kolasch & Birch, LLP

(57) ABSTRACT

A battery module includes a battery cell stack in which a plurality of battery cells are stacked; a module frame for housing the battery cell stack; and a heat sink which is formed under the bottom portion of the module frame and cools the plurality of battery cells. The heat sink includes a lower plate and a partition wall portion forming a flowing path of a refrigerant, and the partition wall portion is formed of a shape memory alloy, and the shape of the partition wall portion is deformed according to temperature, thereby changing the flow of the refrigerant.

7 Claims, 4 Drawing Sheets

(56) References Cited

FOREIGN PATENT DOCUMENTS

| | | |
|---|---|---|
| CN | 111180621 A | 5/2020 |
| DE | 10 2015 007 799 A1 | 2/2025 |
| JP | 2007-299638 A | 11/2007 |
| JP | 2008-300103 A | 12/2008 |
| JP | 5386917 B2 | 1/2014 |
| JP | 2014-192094 A | 10/2014 |
| JP | 2018-147808 A | 9/2018 |
| JP | 2018-170211 A | 11/2018 |
| JP | 2019-142390 A | 8/2019 |
| JP | 2021-51883 A | 4/2021 |
| KR | 10-2013-0136738 A | 12/2013 |
| KR | 10-2014-0087124 A | 7/2014 |
| KR | 10-2016-0065637 A | 6/2016 |
| KR | 10-2018-0038310 A | 4/2018 |
| KR | 10-2019-0036389 A | 4/2019 |
| KR | 10-2020-0011787 A | 2/2020 |
| WO | WO 2018/137374 A1 | 8/2018 |

OTHER PUBLICATIONS

Machine translation JP2019142390A (Year: 2019).*
Machine translation WO2018137374A1 (Year: 2018).*
International Search Report for PCT/KR2021/009647 mailed on Nov. 9, 2021.
Extended European Search Report for European Application No. 21861896.5, dated Feb. 15, 2024.

* cited by examiner

[FIG. 1]
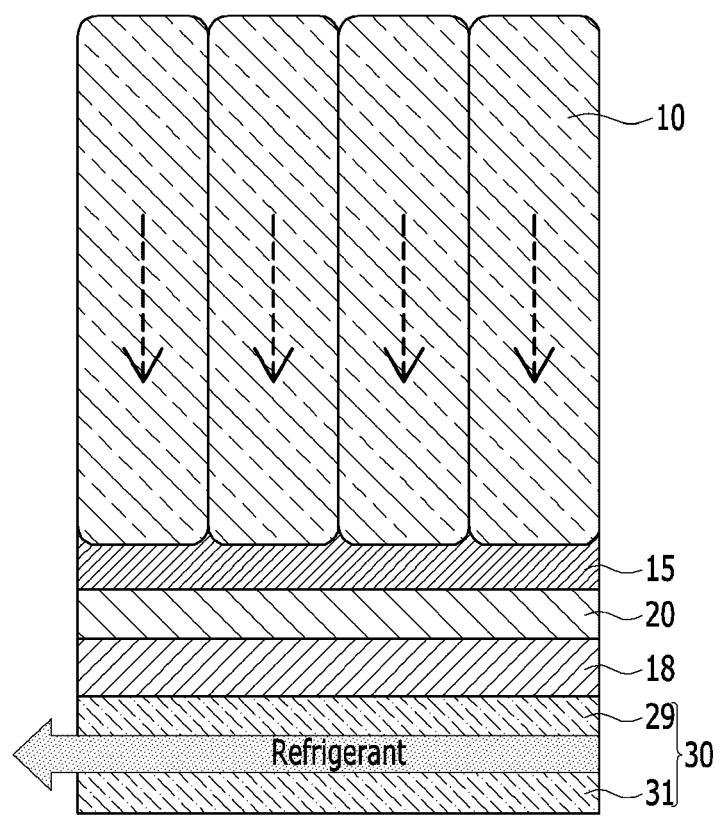
Conventional Art

[FIG. 2]
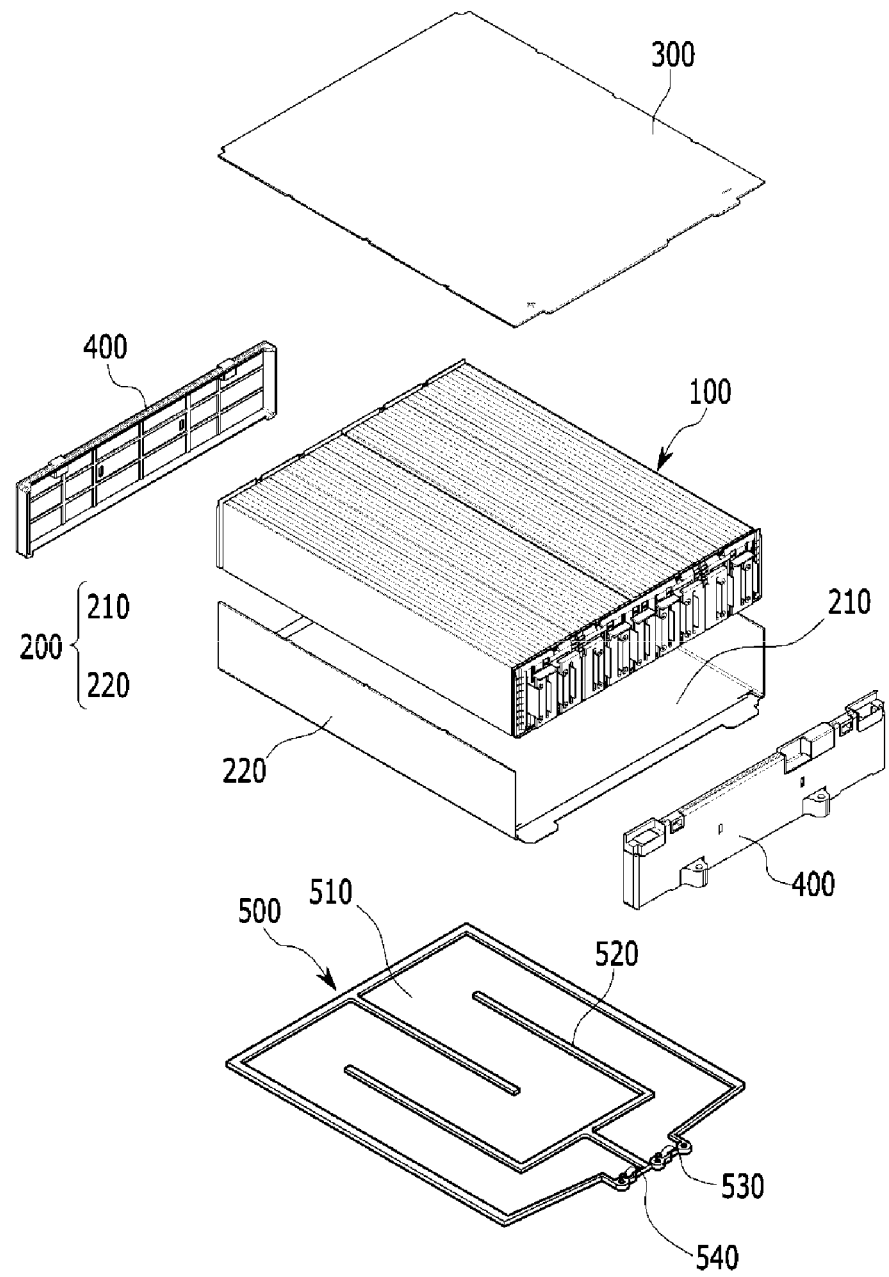

[FIG. 3]
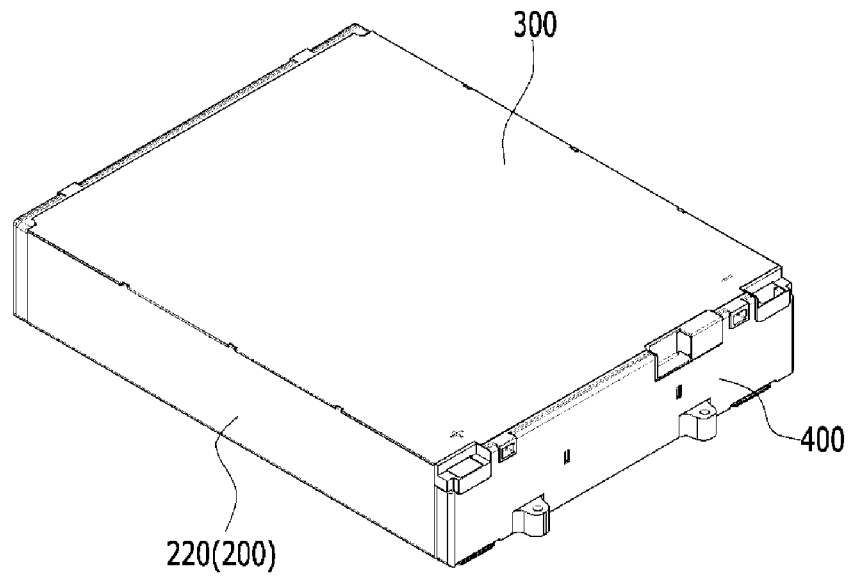
[FIG. 4]
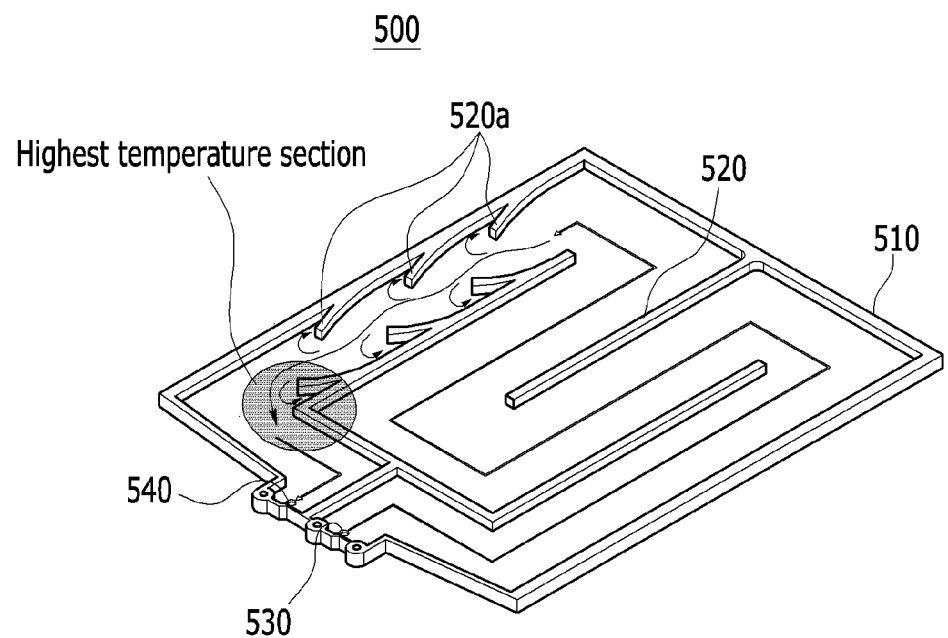

[FIG. 5]
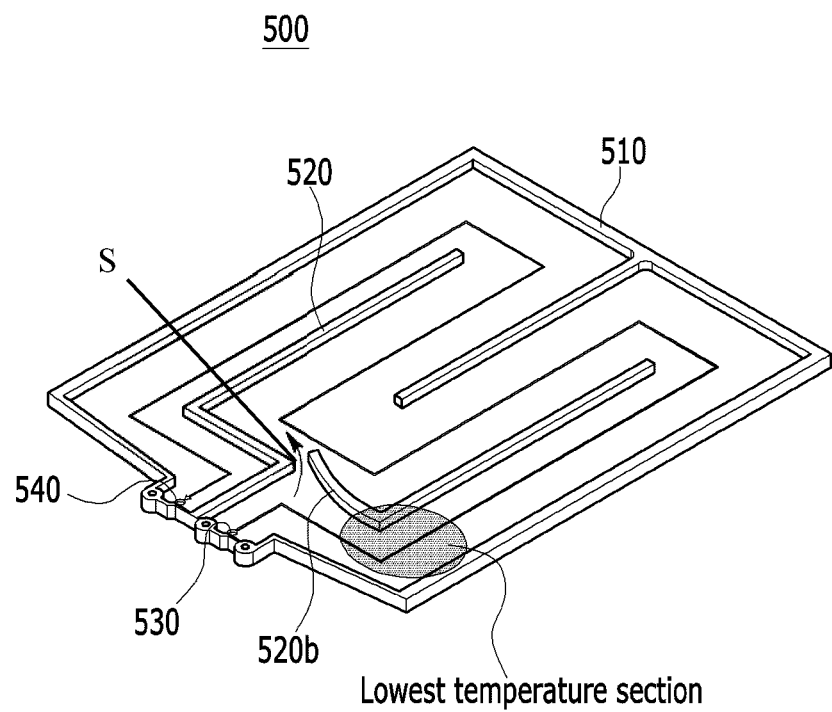

BATTERY MODULE AND BATTERY PACK INCLUDING THE SAME

CROSS CITATION WITH RELATED APPLICATION(S)

This application claims the benefit of Korean Patent Application No. 10-2020-0106332 filed on Aug. 24, 2020 with the Korean Intellectual Property Office, the disclosure of which is incorporated herein by reference in its entirety.

The present disclosure relates to a battery module and a battery pack including the same, and more particularly, to a battery module that improves the cooling performance, and a battery pack including the same.

TECHNICAL FIELD

Background Art

A secondary battery has attracted much attention as an energy source in various products such as a mobile device and an electric vehicle. The secondary battery is a potent energy resource that can replace the use of existing products using fossil fuels, and is in the spotlight as an environment-friendly energy source because it does not generate by-products due to energy use.

Recently, along with a continuous rise of the necessity for a large-capacity secondary battery structure, including the utilization of the secondary battery as an energy storage source, there is a growing demand for a battery pack of a multi-module structure which is an assembly of battery modules in which a plurality of secondary batteries are connected in series/parallel.

Meanwhile, when a plurality of battery cells are connected in series/parallel to configure a battery pack, a method of configuring a battery module composed of battery cells and then adding other components to at least one battery module to configure a battery pack is common.

The battery module may include a battery cell stack in which a plurality of battery cells are stacked, a module frame that houses the battery cell stack, and a heat sink that cools a plurality of battery cells.

FIG. 1 is a diagram showing a battery module coupled with a conventional heat sink.

Referring to FIG. 1, a conventional battery module includes a battery cell stack in which a plurality of battery cells 10 are stacked, a module frame for housing the battery cell stack, and a thermally conductive resin layer 15 located between the bottom portion 20 of the module frame and the battery cell stack. Such a battery module can be formed under the module frame bottom portion 20 and coupled with a heat sink 30 for providing a cooling function to the plurality of battery cells 10, thereby forming a battery pack. Here, a heat conductive layer 18 may be further formed between the bottom portion 20 of the battery module and the heat sink 30. At this time, the heat sink includes a lower plate 31 and an upper plate 29, and a refrigerant may flow between the lower plate 31 and the upper plate 29.

Conventionally, in order to improve the cooling performance of the battery module and/or the battery pack, a separate cooling structure, for example, a heat sink, is required for each battery pack unit. Therefore, the cooling structure tended to be complicated, and the space between the refrigerant and the battery cell stack is formed by a multi-layer structure consisting of an upper plate 29 and a module frame bottom portion 20, whereby there was a limit that it has no choice but to cool the battery cells indirectly.

DETAILED DESCRIPTION OF THE INVENTION

Technical Problem

It is an object of the present disclosure to provide a battery module and a battery pack that improve the cooling performance.

The objects of the present disclosure are not limited to the aforementioned objects, and other objects which are not described herein should be clearly understood by those skilled in the art from the following detailed description.

Technical Solution

According to one embodiment of the present disclosure, there is provided a battery module comprising: a battery cell stack in which a plurality of battery cells are stacked; a module frame for housing the battery cell stack; and a heat sink which is formed under a bottom portion of the module frame and cools the plurality of battery cells, wherein the heat sink comprises a lower plate and a partition wall portion forming a flowing path of a refrigerant, and the partition wall portion is formed of a shape memory alloy, and a shape of the partition wall portion is deformed according to temperature, thereby changing the flow of the refrigerant.

In the portion where the highest temperature is formed, the partition wall portion may be deformed such that a plurality of protrusions are formed on the flowing path of the refrigerant.

The partition wall portion may be deformed so that the plurality of protrusions protrude in an oblique direction toward the flowing direction of the refrigerant.

The plurality of protrusions may be arranged on opposite sides of the flowing path of the refrigerant.

In the section where the lowest temperature is formed, the partition wall portion may be deformed to create a shortcut path so that the flowing path of the refrigerant formed in the section where the lowest temperature is formed becomes a detour path.

The partition wall portion may be deformed so that the partition wall portion formed on the shortcut path is separated, thereby creating the shortcut path.

The shortcut path may be a path that is shorter than the detour path.

The heat sink may include an inlet through which the refrigerant flows in and an outlet through which the refrigerant flows out, and the inlet and the outlet are formed together at a portion of the heat sink.

According to another embodiment of the present disclosure, there is provided a battery pack comprising the battery module.

Advantageous Effects

According to the embodiment of the present disclosure, the flowing path of the refrigerant can be changed according to temperature to reduce the temperature deviation, thereby improving the cooling performance of the battery module.

In addition, simplification of the cooling structure can be realized through the cooling structure in which the module frame and the heat sink are integrated.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 1 is a diagram showing a battery module coupled with a conventional heat sink;

FIG. 2 is an exploded perspective view of a battery module according to one embodiment of the present disclosure;

FIG. 3 is a diagram showing a state in which the components of the battery module of FIG. 2 are assembled.

FIG. 4 is a diagram showing a state in which the partition wall portion is deformed at the highest temperature section according to one embodiment of the present disclosure; and FIG. 5 is a diagram showing a state in which the partition wall portion is deformed at the lowest temperature section according to one embodiment of the present disclosure.

DETAILED DESCRIPTION OF THE EMBODIMENTS

It should be appreciated that the exemplary embodiments, which will be described below, are illustratively described to assist in the understand the present disclosure, and the present disclosure can be variously modified to be carried out differently from the exemplary embodiments described herein. However, in the description of the present disclosure, the specific descriptions and illustrations of publicly known functions or constituent elements will be omitted when it is determined that the specific descriptions and illustrations may unnecessarily obscure the subject matter of the present disclosure. In addition, in order to help understand the present disclosure, the accompanying drawings are not illustrated based on actual scales, but parts of the constituent elements may be exaggerated in size.

As used herein, terms such as first, second, and the like may be used to describe various components, and the components are not limited by the terms. The terms are used only to discriminate one component from another component.

Further, the terms used herein are used only to describe specific exemplary embodiments, and are not intended to limit the scope of the present disclosure. A singular expression includes a plural expression unless they have definitely opposite meanings in the context. It should be understood that the terms "comprise", "include", and "have" as used herein are intended to designate the presence of stated features, numbers, steps, movements, constitutional elements, parts or combinations thereof, but it should be understood that they do not preclude a possibility of existence or addition of one or more other features, numbers, steps, movements, constitutional elements, parts or combinations thereof.

Hereinafter, the configuration of the battery module according to one embodiment of the present disclosure will be described with reference to FIGS. 2 and 3.

FIG. 2 is an exploded perspective view of a battery module according to one embodiment of the present disclosure. FIG. 3 is a diagram showing a state in which the components of the battery module of FIG. 2 are assembled.

Referring to FIGS. 2 and 3, the battery module according to one embodiment of the present disclosure includes a battery cell stack 100 in which a plurality of battery cells are stacked; a module frame 200 for housing the battery cell stack 100, and a heat sink 500 which is formed on the lower side of the module frame 200 and cools the plurality of battery cells.

The battery cell is a secondary battery, and may be configured into a pouch-type secondary battery. Such a battery cell may be composed of a plurality of cells, and the plurality of battery cells may be mutually stacked so as to be electrically connected to each other, thereby forming the battery cell stack 100. Each of the plurality of battery cells may include an electrode assembly, a cell case, and an electrode lead protruding from the electrode assembly.

The module frame 200 houses the battery cell stack 100. According to this embodiment, the module frame 200 may include a bottom portion 210 and both side surface portions 220, and may cover both side surfaces and a bottom surface of the battery cell stack 100. An upper plate 300 may be formed on the upper side surface of the battery cell stack 100 to cover the upper surface portion of the battery cell stack 100.

End plates 400 may be formed on the front and rear surfaces of the battery cell stack 100. The end plate 400 may cover the front and rear surfaces of the battery cell stack 100. The module frame 200, the upper plate 300, and the end plate 400 can physically protect the battery cell stack 100 housed therein.

The heat sink 500 may be formed at the lower portion of the module frame 200. The heat sink 500 may include a lower plate 510 forming a skeleton of the heat sink 500 and contacting with the bottom portion 210 of the module frame 200, an inlet 530 formed on one side of the heat sink 500 to supply a refrigerant to the inside of the heat sink 500 from the outside, an outlet 540 formed on one side of the heat sink so that the refrigerant flowing inside the heat sink flows to the outside of the heat sink, and a partition wall portion 520 that connects the inlet 530 and the outlet 540 and forms the flowing path of the refrigerant. At this time, the inlet 530 and the outlet 540 may be formed together in a portion of the heat sink 500.

Specifically, the flow path through which the refrigerant flows may be formed through a lower plate 510, a module frame bottom portion 210 formed on the upper side of the lower plate 510, and a partition wall 520 formed between the module frame bottom portion 210 and the lower plate 510. In other words, the battery module according to the embodiment of the present disclosure can have a cooling integrated structure in which the bottom portion of the module frame 200 serves to correspond to the upper plate 300 of the heat sink 500.

Conventionally, a structure in which the refrigerant flows is separately formed on the lower side of the module frame, and the module frame has no choice but to cool indirectly. Therefore, the cooling efficiency is reduced, and a separate refrigerant flowing structure is formed, which causes a problem that the space utilization rate on a battery module and a battery pack on which the battery module is mounted is lowered. However, according to one embodiment of the present disclosure, by adopting a structure in which the heat sink 500 is integrated at the lower part of the module frame 200, the refrigerant can flow directly between the lower plate 510 and the module frame bottom portion 210, thereby increasing the cooling efficiency due to direct cooling, and through a structure in which the heat sink 500 is integrated with the module frame bottom portion 210, the space utilization rate on a battery module and a battery pack on which the battery module is mounted can be further improved.

Below, deformation of the partition wall portion according to temperature will be described with reference to FIGS. 2, 4 and 5.

FIG. 4 is a diagram showing a state in which the partition wall portion is deformed at the highest temperature section according to one embodiment of the present disclosure. FIG. 5 is a diagram showing a state in which the partition wall portion is deformed at the lowest temperature section according to one embodiment of the present disclosure.

Referring to FIGS. 2, 4 and 5, the partition wall portion 520 according to the present embodiment is formed of a shape memory alloy (SMA), the shape of the partition wall portion 520 is deformed according to temperature, and the flow of the refrigerant is changed accordingly.

In a large-area battery module in which a battery cell stack formed of 12 to 24 battery cells is housed as in the present embodiment, due to the increase in size of the module, a large temperature deviation of the battery cells in the battery module may occur in a high temperature state. When a large temperature deviation occurs, there is a possibility that the performance of the battery cell is deteriorated.

In order to overcome such a drawback, conventionally, an attempt was made to adjust the temperature inside the battery module by providing a cooling system for the battery module, but there was a limit to reducing the temperature deviation of the battery cells only by adjusting the flow rate or temperature of the supplied refrigerant.

Thus, according to the present embodiment, a shape memory alloy that responds to a constant temperature was applied to the partition wall portion 520 of the heat sink 500 that functions as a cooling system. Through this, the partition wall portion 520 can be deformed according to a constant temperature, thereby changing the flowing path of the refrigerant. More specifically, at the point where the temperature is high, the flowing path is adjusted so as to relatively reduce the flowing speed of the refrigerant, whereby the temperature at high temperature points can be relatively significantly lowered. At the point where the temperature is low, the flowing path is adjusted so as to relatively increase the flowing speed of the refrigerant, whereby the temperature at low temperature points can be made relatively low.

In FIG. 4, a state in which the partition wall portion 520 is deformed at the highest temperature section is shown.

According to the present embodiment, in the section where the highest temperature is formed, the partition wall portion 520 may be deformed such that a plurality of protrusions 520a are further formed on the flowing path of the refrigerant. The partition wall portion 520 may be deformed such that a plurality of protrusions 520a protruding obliquely toward the flow direction of the coolant are further formed. Further, the plurality of protrusions 520a may be alternately arranged on both sides of the flowing path of the refrigerant.

As shown in FIG. 4, the partition wall portion 520 is deformed to have a plurality of protrusions 520a in front of the point where the highest temperature part is formed, whereby the flow facing the plurality of protrusions 520a may significantly reduce the overall flow progress speed due to the formation of the protrusion structure of the partition wall, such as vortex formation on the surface of the protrusions. Further, when the flowing speed decreases, the time during which the refrigerant stays at the point where the highest temperature part is formed relatively increases, whereby the heat generated in the highest temperature section is transferred in a relatively large amount, and thereby the temperature of the corresponding section can be reduced in a relatively large amount.

In addition, as shown in FIG. 4 the highest temperature section is formed relatively close to the outlet 540. Thus, even if the refrigerant flowing in through the inlet 530 passes through the flow path and the temperature of the refrigerant rises relatively as it approaches the outlet 540, the temperature of the relevant portion can be lowered in a relatively large amount as long as the flow velocity itself becomes slower.

In this embodiment, the highest temperature section has been mainly described, but deformation of the partition wall portion does not occur only at the highest temperature point. When it is a section having a temperature relatively higher than other points, the partition wall portion at the corresponding position is protruded and the flow velocity of the refrigerant is reduced, so that the temperature of the corresponding section can be further lowered compared to other points.

In FIG. 5, a state in which the partition wall portion 520 is deformed at the lowest temperature section is shown.

According to the present embodiment, in the section where the lowest temperature is formed, the partition wall portion 520 may be deformed so that the refrigerant flow path becomes a bypass path to newly create a shortcut path S. At this time, the partition wall portion 520 is deformed so that a portion of the partition wall 520b formed on the shortcut path S is separated, and thus, the shortcut path S can be newly created. According to the present embodiment, the portion of the separated partition wall 520b may be separated by being bent in a curved shape toward the shortcut path S.

As shown in FIG. 5, a portion of the partition wall 520b at the point where the lowest temperature part is formed is separated, and a shortcut path S shorter than the existing detour path can be newly created. Therefore, due to the new creation of the shortcut path S, two refrigerant flow paths such as a detour path and a shortcut path are formed. The flow rate of the refrigerant flowing through the detour path is relatively reduced, and the amount of heat transferred to the refrigerant is reduced, so that the temperature of the corresponding section can be lowered in a relatively low amount.

In addition, since the flow velocity of the refrigerant passing through the detour path increases than before newly creating the shortcut path S, the time during which the refrigerant stays at the point where the lowest temperature section is formed is relatively reduced, whereby so that the heat generated in the lowest temperature section is transferred in a relatively low amount, so that the temperature of the lowest temperature section can be reduced relatively less than other points.

In this embodiment, the description was focused on the lowest temperature part, but the deformation of the partition wall portion does not occur only at the lowest temperature point. In the case of a relatively lower temperature point than other points, the partition wall portion at the corresponding location is separated so that a new path can be newly created. Thereby, the flow rate of the new path is distributed, and the flow rate passing through the corresponding location is reduced, so that the temperature of the corresponding section can be lowered less than that of other points.

The above-mentioned battery module can be included in the battery pack. The battery pack may have a structure in which one or more of the battery modules according to the embodiment of the present disclosure are gathered, and packed together with a battery management system (BMS) and a cooling device that control and manage battery's temperature, voltage, etc.

The battery pack can be applied to various devices. Such a device may be applied to a vehicle means such as an electric bicycle, an electric vehicle, or a hybrid vehicle, but the present disclosure is not limited thereto, and is applicable to various devices that can use a battery module, which also belongs to the scope of the present disclosure.

Although the invention has been shown and described with reference to the preferred embodiments, the scope of the present disclosure is not limited thereto, and numerous other modifications and embodiments can be devised by those skilled in the art without deviating from the spirit and scope of the principles of the invention described in the appended claims. Further, these modified embodiments should not be understood individually from the technical spirit or perspective of the present disclosure.

DESCRIPTION OF REFERENCE NUMERALS

100: battery cell stack 200: module frame
210: module frame bottom portion 220: module frame side surface portion
300: upper plate 400: end plate
500: heat sink 510: lower plate
520: partition wall portion 520a: protrusion
520b: separated partition wall 530: inlet
540: outlet S: shortcut path

The invention claimed is:

1. A battery module comprising:
a battery cell stack in which a plurality of battery cells are stacked;
a module frame for housing the battery cell stack; and
a heat sink which is formed under a bottom portion of the module frame and cools the plurality of battery cells,
wherein the heat sink comprises a lower plate and a partition wall forming a flowing path of a refrigerant extending upward from the lower plate,
wherein the partition wall is formed of a shape memory alloy, and a shape of the partition wall is deformed according to temperature, thereby changing the flow of the refrigerant,
wherein the flowing path has an inlet and an outlet and the partition wall forms a serpentine path between the inlet and outlet, and
wherein a portion of the partition wall has a first position to separate a first section of the serpentine path from a second section of the serpentine path and a second position creating an opening between the first section to the second section.

2. The battery module of claim 1, wherein in a section where the highest temperature is formed, the partition wall is deformed such that a plurality of protrusions are formed on the flowing path of the refrigerant.

3. The battery module of claim 2, wherein a downstream end of each of the plurality of protrusions is attached to the partition wall, and
wherein the partition wall is deformed so that the plurality of protrusions protrude obliquely toward the flowing direction of the refrigerant.

4. The battery module of claim 3, wherein the plurality of protrusions are arranged on the partition wall on opposite sides of the flowing path of the refrigerant.

5. The battery module of claim 1, wherein in the second position the portion of the partition wall creates a shortcut path that is shorter than the flowing path between the inlet and outlet when the portion of the partition wall is in the first position.

6. The battery module of claim 5, wherein the portion of the partition wall is bent in a curved shape toward the shortcut path.

7. A battery pack comprising the battery module of claim 1.

* * * * *